US005637629A

United States Patent [19]
Moro et al.

[11] Patent Number: 5,637,629
[45] Date of Patent: Jun. 10, 1997

[54] REINFORCED POLYOLEFINIC THERMOPLASTIC COMPOSITION

[75] Inventors: Alessandro Moro, Cazzago; Italo Borghi, Ferrara; Paolo Venti, Padova; Domenico Vianello, Campalto; Roberto Pippa, Noale, all of Italy

[73] Assignee: Enichem S.p.A., Italy

[21] Appl. No.: 692,247

[22] Filed: Aug. 7, 1996

Related U.S. Application Data

[63] Continuation of Ser. No. 385,214, Feb. 8, 1995, abandoned, which is a continuation of Ser. No. 152,573, Nov. 15, 1993, abandoned.

[30]     Foreign Application Priority Data

Nov. 18, 1992  [IT]  Italy ................................ MI92A2633

[51] Int. Cl.$^6$ ..................... C08J 5/12; C08K 3/34
[52] U.S. Cl. .................... 523/203; 523/212; 523/213; 524/83; 524/188; 524/436; 524/437; 524/444; 524/445; 524/447; 524/450; 524/451; 524/456
[58] Field of Search ................ 524/83, 188, 436, 524/437, 447, 450, 451, 444, 445, 456; 523/203, 212, 213

[56]     References Cited

U.S. PATENT DOCUMENTS

| 3,882,068 | 5/1975 | Swartz | 524/582 |
| 3,956,230 | 5/1976 | Gaylord | 260/42.14 |
| 4,409,342 | 10/1983 | Ancker et al. | 523/202 |
| 4,429,064 | 1/1984 | Marzola et al. | 523/213 |
| 4,433,073 | 2/1984 | Sano et al. | 523/201 |
| 4,873,116 | 10/1989 | Ancker et al. | 428/36.9 |
| 4,975,509 | 12/1990 | Joslyn et al. | 526/279 |
| 5,075,351 | 12/1991 | Joslyn et al. | 524/445 |

FOREIGN PATENT DOCUMENTS

| 192875 | 9/1981 | Czechoslovakia . |
| 0008703 | 3/1980 | European Pat. Off. . |
| 49-41096 | 11/1974 | Japan . |
| 1110930 | 4/1968 | United Kingdom . |
| 1117200 | 6/1968 | United Kingdom . |
| 2225328 | 5/1990 | United Kingdom . |

*Primary Examiner*—Helen Lee

[57]     ABSTRACT

Reinforced polyolefinic thermoplastic composition comprising a polyolefin, an aluminum and/or magnesium silicate and a maleamic silane.

11 Claims, No Drawings

REINFORCED POLYOLEFINIC THERMOPLASTIC COMPOSITION

This is a continuation of application Ser. No. 08/385,214, filed on Feb. 8, 1995, now abandoned, which is a continuation of 08/152,573, filed on Nov. 15, 1993, now abandoned.

The present invention relates to a reinforced polymeric thermoplastic compositions.

More in particular, the present invention relates to reinforced polyolefinic compositions adapted to be fabricated into articles having mechanical properties of resilience, especially at temperatures lower than 0° C., that are superior to those of the corresponding un-reinforced polyolefinic compositions.

As is known, polyolefins are used in a wide variety of end uses including in the form of films, fibers, moulded or thermoformed articles, pipes and/or coatings. In some of these end-uses, especially when the polyolefin is fabricated into shaped articles by moulding techniques, it is requested that the fabricated article exhibit stiffness and toughness properties that are superior to those obtainable from the polyolefin per se.

Many techniques for the modication of the properties of polyolefins are known and described in the literature; they include the cross-linking of the polymer or the incorporation of additives, such as for example elastomers, or fillers into the polymeric matrix. Generally, the polyolefinic compositions reinforced with fillers tend to exhibit a higher stiffness than that of the starting polymer alone.

It is known, however, that the polyolefins, due to their apolar character, are not suited for being reiforced by inorganic or organic additives; in fact, the increase in stiffness is usually accompanied by a decrease in other important properties, including toughness, In order to overcome such a drawback it had been suggested either to modify the olefinic polymer by grafting onto the hydrocarbon chain monomers having polar groups, or by using a so-called "adhesion promoter", namely a compound which imply increased adhesion or bonding between the filler and the polymer matrix.

Thus, for example, G.B. Patent Nos. 1,110,930 and 1,177,200 disclose reinforced compositions comprising a polyolefin, an inorganic filler and an organosilane containing a hydrolysable group capable of reacting with the hydroxyl groups present in the inorganic filler.

Czechoslovak Patent No. 192,875 discloses mixtures of polyethylene and kaolin modified by a basic silane.

U.S. Pat. No. 3,956,230 discloses polymeric compositions, such as for example polyolefins, reinforced with a filler containing hydroxyl groups. The filler is made compatible with the polymer by mixing polymer and filler in the presence of a coupling agent, such as for example maleic anhydride, and a free radical initiator.

G.B. Patent No. 2,225,328 discloses reinforced compositions comprising polyethylene modified by grafting at least one of an ethylenically unsaturated carboxylic acid or carboxylic acid anhydride, and an aluminium silicate having the surface treated with an amino-silane compound.

Japanese Patent Application No. 74-041,096, published 1974 Nov. 7 discloses filled polyolefin compositions obtained by reacting a polyolefin, maleic acid or anhydride and glass fibers pre-treated with an amino-silane compound.

European Patent No. 0,008,703 describes the use of a bis-maleamic acid, such as for example N,N'-hexamethylene-bis-maleamic acid, N,N'-dodecamethylene-bis-maleamic acid or N,N'-isophorone-bis-maleamic acid, as coupling agent capable of promoting the adhesion between a polyolefin and glass fibers.

U.S. Pat. No. 4,429,064 describes the use of a maleamic acid or of a maleamic silane as an agent for promoting the adhesion of the mica to the polyolefin. In the specification of the patent it is set forth that the resulting compositions exhibit improved properties of mechanical resistance; the examples exemplify compositions having an ultimate tensile strength not higher than 419 N/mm$^2$, and an IZOD resilience, determined by notched bar test, at room temperature, not higher than 3.4 Kgcm/cm, corresponding to 33.4 J/m.

It has now been found by the Applicant that the properties of the reinforced polyolefinic compositions may be further improved, especially at temperatures lower than 0° C., such as at −40° C., by using an aluminum and/or magnesium silicate, as inorganic filler, and a maleamic silane as agent for promoting the edhesion between the aluminum and/or magnesium silicate and the polyolefin.

The subject matter of the present invention is, therefore, a reinforced polyolefinic composition comprising:

(A) from 30 to 90% by weight of a polyolefin selected from the group consisting of homopolymers of ethylene and copolymers of ethylene with at least one other alpha-olefin containing from 3 to 10 carbon atoms;

(B) from 70 to 10% by weight of aluminum silicate and/or magnesium silicate;

(C) from 0.01 to 10 parts by weight, with respect to 100 parts of (A)+(B), of a maleamic silane having general formula:

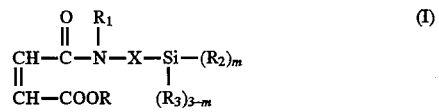

wherein:

R and $R_1$ may be independently selected from hydrogen andan alkyl radical containing from 1 to 8 carbon atoms;

$R_2$ is a alkoxy hydrolysable group containing from 1 to 6 carbon atoms or a halogen atom;

$R_3$ is an alkyl radical containing from 1 to 8 carbon atoms;

X may be a radical of formula:

an aromatic, cycloaliphatic o heterocyclic divalent radical, wherein $R_4$ is hydrogen or an alkyl radical containing from 1 to 18 carbon atoms and n is an integer ranging from 1 to 4; and m is an integer ranging from 1 to 3, extremes included.

Particularly preferred reinforced polyolefinic compositions of the present invention are those comprising from 50 to 80 parts by weight of a polyolefin (A), from 50 to 20 parts by weight of an aluminum and/or magnesium silicate (B), and from 0,05 to 5 parts by weight, with respect to the (A)+(B) mixture, of the maleamic silane (C) of formula (I).

Maleamic silanes of formula (I) particularly preferred in the compositions of the present invention are those wherein R and $R_1$ are hydrogen; $R_2$ is a straight or branched alkoxy radical containing from 1 to 4 carbon atoms, such as: —O—CH$_3$; —O—C$_2$H$_5$; —O—C$_3$H$_7$ or —O—C$_4$H$_9$; $R_4$ is hydrogen; n is 2 or 3, and m is zero.

The maleamic silanes having the above reported formula (I) are products well known and available on the market.

They may be prepared according to techniques known and extensively described in literature such as, for example, in U.S. Pat. No. 4,429,064.

A method for preparing the maleamic silanes of formula (I) consists in reacting maleamic acid with a reactive organosilane of general formula:

wherein X, $R_2$, $R_3$ e m have the meanings defined hereinabove, and A is a functional group capable of reacting with the carboxylic groups of the maleamic acids such as, for example, an amine, epoxy, mercaptane, ester, vinyl or halogen group.

A preferred method consists in reacting gamma-aminoalkylentrietoxysilane with maleic anhydride or a reactive derivative thereof, such as maleic acid or an alkylester or chloride thereof, at about 70° C., in nitrogen atmosphere, in a 1:1 molar ratio.

The polyolefins of the composition of the present invention may be a homopolymer of ethylene and/or a copolymer of ethylene with at least one other alpha-olefin containing from 3 to 10 carbon atoms. Examples of such alpha-olefins are propylene, butene-1, hexene-1, heptene-1 and so on. When the polyolefin is a homopolymer of ethylene or a copolymer thereof with a smaller amounts of at least one other $C_3$–$C_{10}$ alpha-olefin, such as for example from 2 to 25 parts by weight, the density of the polyolefin ranges from 0.85 to 0.97 g/$cm^3$ and especially from 0.940 to 0.960 g/$cm^2$.

The Melt Flow Index of the polyolefin is generally lower than 15 g/10 min. and preferably it is comprised between 3 and 8 g/10 min.

Polyolefins preferred in the compositions of the present invention are those known as low density polyethylene (LDPE), linear low density polyethylene (LLDPE) and high density polyethylene (HDPE). These polymers are commercially known, for example, under the trade mark ESCORENE® LL 1201 XV (LLDPE) from Soc. EXXON; RIBLENE® AK 1912 (LDPE) from Soc. ENICHEM; ERACLENE® HUG 5013 (HDPE) from Soc. ENICHEM.

High density polyethylene (HDPE) is particularly preferred in the composition of the present invention.

Any aluminum and/or magnesium silicate available on the market may be used for preparing the compositions of the present invention.

Aluminum silicate is generally prepared by calcining the ground kaolin in order to dehydrate the kaolin.

The particle sizes of the filler may be important, as it is known in the art. Fine particle sizes tend to provide products of higher impact strength than that of the products containing larger particle sizes. Generally, the particle sizes of the aluminum silicate range from 0.1 to 2 micrometers and preferably from 0.5 to 1.2 micrometers.

Aluminum and/or magnesium silicate can be used as such or better treated on the surface with a functionalizing agent in order to promote the adhesion of the filler with the polyolefin. Amine-silane, such as for example, gamma-amino-alkylenetrietoxy silanes, can be used as functionalizing agents.

Aluminum silicate, generally known as kaolin, either as such or treated on the surface with a amine-silane, is available on the market under the trade marks SATINTONE® and TRANSLINK® 555 from Soc. ENGELHARD.

Magnesium silicate, generally known as talcum, either as such or treated on the surface, is also it available on the market, for example, under the trade mark NAITSCH® A3V612 from Soc. NAITSCH.

The compositions of the present invention may be prepared by feeding the components of the composition, in any possible order, to any admixing apparatus suitable for producing thermoplastic compositions and by successively bringing the mixture to a temperature at least equal to the polymer melting temperature, such as from 180° to 220° C. Single-screw and twin-screw mixer, Banbury mixer and other known mixers for preparing blends of thermoplastic polymers can be used.

Instead of the maleamic silane of formula (I) as such, it is possible to mix, with the aluminum silicate and the polymer, the precursor compounds of such additives, which, successively, during the hot mixing and moulding steps, react at least partially with one another to originate the additive comprised in the above-reported formula (I). Thus, for example, it is possible to mix with aluminum silicate and polyolefin, alone or mixed together, maleic anhydride and a reactive silane of formula (II). The addition of the various components, including the above-said precursors, to obtain the final product, can be carried out in any succession, provided that the final composition has a homogeneous structure.

The reinforced polymeric compositions of the present invention are characterized by a high resilience (IZOD), especially at low temperatures such as, for example, at –40° C., and by a high fluidity, which make them particularly suitable to be used in the injection moulding. In fact, the Melt Flow Index of the compositions of the present invention is generally higher than 2 g/10 min. at 190° C. and 2.16 Kg.

Conventional additives and/or auxyliary compounds may be further incorporated, if it is necessary, to the compositions of the present invention, in order to improve tha characteristics of thermal stability, stability to oxidation and to the light; other additives such as pigments, dyestuffs, flame-retardant agents, releasing agents, other types of thermoplastic resins or rubbers can be added to impart high impact properties. These additives are generally added in an amount comprised between 0.1 to 50 parts by weight.

For a better understanding of the present invention and to reduce it to practice, a few illustrative but do not limitative examples are given hereinafter.

In the examples, all parts and percentages are given by weight, if not differently indicated.

In the examples, for measuring the characteristics of the compositions, the following methods were used:

Mechanical Properties

The IZOD resiliences with notch were measured at 23° C. and at –40° C. using the procedure of ASTM D 256, on test samples having a thickness of 3.2 mm.

Rheological Properties

The Melt Flow Indeces (M.F.I.) were measured using the procedure of ASTM D 1238, at 190° C. and at 2.16, 10 and 21.6 kg, respectively.

EXAMPLE 1

The following components were charged into a dry-blend mixer:

7 kg of high density polyethylene (HDPE), ERACLENE® HUG 5013, having a melt flow index of 4.5 g/10 min. and 3 Kg of kaolin treated on the surface with a amino-silane, available on the market under the trade name TRANSLINK® from So. ENGELHARD.

15 g of a 10% by weight mixture of a maleamic silane of formula:

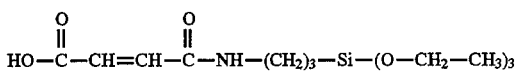

in a 90/10 weight ratio ethyl alcohol/water mixture were added to the resulting blend.

The mixtures thus obtained were gently mixed for 15 min. and then extruded through a ICMA San Giorgio twin-screw extruder at a temperature of 220° C. and at 150 rpm.

The extruded product was injection moulded by using a Battenfeld 750 at the following conditions:

Temperature of the cylinder and nozzle: 200° C.;
Temperature of the mould: 50° C.;
Injection time: 20 sec.;
Total time of the cycle: 45 sec.

The properties of the test samples thus obtained are listed in the following Table.

EXAMPLE 2

Example 1 was repeated by substituting the kaolin treated on the surface with untreated kaolin available on the market under the trade mark SATINTONE® from Soc. ENGEL-HARD.

The properties of the test samples thus obtained are listed in the following Table.

EXAMPLE 3

Example 1 was repeated by substituting the kaolin treated on the surface with talc treated on the surface, available on the market under the trade mark NAITSCH® from Soc. NAITSCH.

The properties of the test samples thus obtained are listed in the following Table.

EXAMPLE 4 (comparison)

Example 1 was repeated by substituting the kaolin treated on the surface with untreated mica.

The properties of the test samples thus obtained are listed in the following Table.

EXAMPLE 5 (comparison)

Example 1 was repeated by omitting the addition of the maleamic silane compound solution.

The properties of the test samples thus obtained are listed in the following Table.

TABLE

| EXAMPLE No. | | 1 | 2 | 3 | 4 | 5 |
|---|---|---|---|---|---|---|
| IZOD | at +23° C. (J/m) | 514 | 531 | 300 | 30 | 90 |
| | at −40° C. (J/m) | 451 | 391 | 250 | 30 | 60 |
| M.F.I. | at 2,16 kg(g/10 min) | 2,1 | 2,1 | 2,0 | 2,2 | 2,3 |
| | at 10 kg(g/10 min) | 17,5 | 17,8 | 18 | 20 | 18,7 |
| | at 21,6 kg(g/10 min) | 62 | 63 | 65 | 70 | 64 |

We claim:

1. A reinforced poly-alpha-olefinic composition consisting essentially of:
   (A) from 30 to 90 parts by weight of a polyolefin selected from the group consisting of homopolymers of ethylene and copolymers of ethylene with at least one other alpha-olefin containing from 3 to 10 carbon atoms;
   (B) from 70 to 10 parts by weight of aluminum silicate or magnesium silicate;
   (C) from 0.01 to 10 parts by weight, based on 100 parts of (A)+(B), of a maleamic silane having formula:

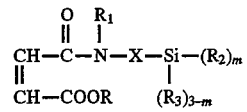

wherein:

R and $R_1$ are independently selected from hydrogen and an alkyl radical containing from 1 to 8 carbon atoms;

$R_2$ is an alkoxy hydrolyzable group containing from 1 to 6 carbon atoms or a halogen atom;

$R_3$ is an alkyl radical containing from 1 to 8 carbon atoms;

X is a radical of the formula:

or an aromatic or cycloaliphatic divalent radical, wherein $R_4$ is hydrogen or an alkyl radical containing from 1 to 18 carbon atoms and n is an integer ranging from 1 to 4; and m is an integer ranging from 1 to 3;

wherein the composition has an Izod resilience with notch at −40° C. of about 250 to about 451 J/m.

2. Reinforced poly-alpha-olefinic composition according to claim 1, wherein the composition includes from 50 to 80 parts by weight of a polyolefin (A), from 50 to 20 parts by weight of an aluminum silicate, magnesium silicate or a mixture of aluminum silicate and magnesium silicate (B), and from 0.05 to 5 parts by weight, based on the (A)+(B) mixture, of the maleamic silane (C) of formula (I).

3. Reinforced poly-alpha-olefinic composition according to claim 1, wherein the maleamic silane (C) has formula (I), wherein R and $R_1$ are hydrogen; $R_2$ is a straight or branched alkoxy radical containing from 1 to 4 carbon atoms; $R_4$ is hydrogen; and n is 2 or 3.

4. Reinforced poly-alpha-olefinic composition according to claim 3, wherein $R_2$ is selected from the group consisting of —O—$CH_3$, —O—$C_2$—$H_5$, —O—$C_3$—$H_7$, and —O—$C_4$—$H_9$.

5. Reinforced poly-alpha-olefinic composition according to claim 1, wherein the polyolefin is a homopolymer of ethylene or a copolymer of ethylene with 2–25% by weight of at least one other alpha-olefin containing from 3 to 10 carbon atoms.

6. Reinforced polyolefinic composition according to claim 5, wherein the polyolefin has a density ranging from 0.85 to 0.97 g/cm³ and a Melt Flow Index lower than 15 g/10 min.

7. Reinforced polyolefinic composition according to claim 6, wherein the polyolefin has a density ranging from 0.940 to 0.960 g/cm³ and a Melt Flow Index ranging from 3 to 8 g/10 min.

8. Reinforced poly-alpha-olefinic composition according to claim 1, wherein the aluminum or magnesium silicate is treated on the surface with a aminesilane.

9. Reinforced poly-alpha-olefinic composition according to claim 1, wherein the aluminum or magnesium silicate is in the form of particles having sizes ranging from 0.1 to 2 micrometers.

10. Reinforced poly-alpha-olefinic composition according to claim 1, wherein the composition further essentially comprises additives or auxiliary substances to improve the characteristics of thermal stability, stability to oxidation and to light, or pigments, dyestuffs, flame-retardant agents, releasing agents, other types of thermoplastic resins or rubbers to impart high impact properties, in an amount between 0.1 to 50% by weight.

11. Reinforced poly-alpha-olefinic composition according to claim 9, wherein the particles have a size range from 0.5 to 1.2 micrometers.

* * * * *